United States Patent
Feenaughty et al.

(10) Patent No.: US 10,889,520 B2
(45) Date of Patent: Jan. 12, 2021

(54) GLASS FORMING APPARATUSES AND METHODS FOR MAKING GLASS RIBBONS

(71) Applicant: CORNING INCORPORATED, Corning, NY (US)

(72) Inventors: John Michael Feenaughty, Arkport, NY (US); Vladislav Yuryevich Golyatin, Avon (FR); Bulent Kocatulum, Horseheads, NY (US); Jeremy Walter Turner, Elmira, NY (US)

(73) Assignee: Corning Incorporated, Corning, NY (US)

( * ) Notice: Subject to any disclaimer, the term of this patent is extended or adjusted under 35 U.S.C. 154(b) by 224 days.

(21) Appl. No.: 16/094,131

(22) PCT Filed: Apr. 13, 2017

(86) PCT No.: PCT/US2017/027328
§ 371 (c)(1),
(2) Date: Oct. 16, 2018

(87) PCT Pub. No.: WO2017/184417
PCT Pub. Date: Oct. 26, 2017

(65) Prior Publication Data
US 2019/0119140 A1 Apr. 25, 2019

Related U.S. Application Data

(60) Provisional application No. 62/324,613, filed on Apr. 19, 2016.

(51) Int. Cl.
*C03B 17/06* (2006.01)
*C03B 17/02* (2006.01)
(Continued)

(52) U.S. Cl.
CPC ............ *C03B 17/067* (2013.01); *C03B 5/44* (2013.01); *C03B 17/02* (2013.01); *C03B 17/064* (2013.01);
(Continued)

(58) Field of Classification Search
CPC ........................... C03B 17/064; C03B 17/067
See application file for complete search history.

(56) References Cited

U.S. PATENT DOCUMENTS 3,737,294 A 6/1973 Dumbaugh, Jr.
3,746,526 A 7/1973 Giffen
(Continued)

FOREIGN PATENT DOCUMENTS

DE 102004019014 A1 11/2005
EP 1746076 A1 1/2007

OTHER PUBLICATIONS

International Search Report and Written Opinion of the International Searching Authority; PCT/US2017/027328; dated Oct. 20, 2017; 16 Pages; European Patent Office.

*Primary Examiner* — Cynthia Szewczyk
(74) *Attorney, Agent, or Firm* — Michael A. Hood; Svetlana Z. Short

(57) ABSTRACT

Described herein are glass forming apparatuses with cooled muffle assemblies and methods for using the same to form glass ribbons. According to one embodiment, a muffle assembly for a fusion forming apparatus may include a muffle frame comprising a back wall, a front wall opposite the back wall, and a pair of sidewalls joining the front wall to the back wall in a closed-loop. At least one first cooling tube may extend through the back wall and the front wall across the closed-loop. At least one second cooling tube may extend through the back wall and the front wall across the closed loop such that the at least one second cooling tube is (Continued)

spaced apart from and parallel with the at least one first cooling tube.

9 Claims, 6 Drawing Sheets

(51) Int. Cl.
*C03B 5/44* (2006.01)
*F27B 5/10* (2006.01)
*F27B 5/18* (2006.01)
*F27B 5/06* (2006.01)

(52) U.S. Cl.
CPC .................. *F27B 5/10* (2013.01); *F27B 5/18* (2013.01); *F27B 2005/064* (2013.01)

(56) References Cited

U.S. PATENT DOCUMENTS

| | | | |
|---|---|---|---|
| 3,849,097 A | 11/1974 | Giffen et al. | |
| 3,931,438 A | 1/1976 | Beall et al. | |
| 4,102,664 A | 7/1978 | Dumbaugh, Jr. | |
| 4,214,886 A | 7/1980 | Shay et al. | |
| 5,250,097 A | 10/1993 | Saitoh et al. | |
| 5,342,426 A | 8/1994 | Dumbaugh, Jr. | |
| 5,559,060 A | 9/1996 | Dumbaugh, Jr. et al. | |
| 7,201,965 B2 | 4/2007 | Gulati et al. | |
| 7,514,149 B2 | 4/2009 | Bocko et al. | |
| 8,007,913 B2 | 8/2011 | Coppola et al. | |
| 8,141,388 B2 | 3/2012 | Burdette | |
| 9,296,635 B2 * | 3/2016 | Chalk ................... | C03B 17/064 |
| 9,796,616 B2 | 10/2017 | Coppola et al. | |
| 2007/0130994 A1 | 6/2007 | Boratav et al. | |
| 2008/0282736 A1 | 11/2008 | Filippov et al. | |
| 2010/0212360 A1 | 8/2010 | Delia et al. | |
| 2011/0289969 A1 | 12/2011 | Delia et al. | |
| 2013/0015180 A1 | 1/2013 | Godard et al. | |
| 2014/0318182 A1 | 10/2014 | Coppola et al. | |
| 2016/0083281 A1 | 3/2016 | Ahrens | |
| 2016/0159677 A1 * | 6/2016 | Coppola ................. | C03B 17/064 65/53 |
| 2018/0327298 A1 | 11/2018 | Coppola et al. | |

\* cited by examiner

GLASS FORMING APPARATUSES AND METHODS FOR MAKING GLASS RIBBONS

This application claims the benefit of priority under 35 U.S.C. § 371 of International Application No. PCT/US2017/027328, filed Apr. 13, 2017, which claims the benefit of priority to U.S. Application No. 62/324,613, filed Apr. 19, 2016, the content of each of which is incorporated herein by reference in its entirety.

BACKGROUND

Field

The present specification generally relates to glass forming apparatuses and, more specifically, to glass forming apparatuses for use with fusion forming processes such as the fusion process and/or the laminate fusion process.

Technical Background

Various glass down draw processes may be used to form glass articles such as glass sheets and/or laminated glass sheets. These glass articles may be used in a variety of applications including, without limitation, as cover glasses in electronic devices such as LCD displays, smart phones, and the like. The glass articles may be manufactured by downwardly flowing streams of molten glass over one or more forming bodies and joining the molten glass streams to form a continuous glass ribbon. Thereafter, the continuous glass ribbon may be segmented into a plurality of discrete glass articles. This forming process may be referred to as a fusion process or a laminate fusion process.

Various properties of the glass ribbon produced by the fusion process or the laminate fusion process may be related to the temperature of the molten glass as it flows over the forming bodies. For example, cooling of the glass (or the lack thereof) may alter the volume of glass flow through the glass forming apparatus. In the case of laminated glass ribbons formed by the laminate fusion process, temperature differentials between the glass compositions forming the various plies of the laminate may alter the ratio of thicknesses of the glass plies, making it difficult to manufacture a glass ribbon having plies with certain thickness ratios.

Accordingly, a need exists for alternative glass forming apparatuses which enhance the control of the temperature of the molten glass as it flows through the glass forming apparatus.

SUMMARY

According to one embodiment, a muffle assembly for a fusion forming apparatus may include a muffle frame comprising a back wall, a front wall opposite the back wall, and a pair of sidewalls joining the front wall to the back wall in a closed-loop. At least one first cooling tube may extend through the back wall and the front wall across the closed-loop. At least one second cooling tube may extend through the back wall and the front wall across the closed loop such that the at least one second cooling tube is spaced apart from and parallel with the at least one first cooling tube.

According to another embodiment, a glass forming apparatus for forming a glass ribbon may include a forming body comprising a first outer forming surface and a second outer forming surface extending in a downward vertical direction. The glass forming apparatus may also include a muffle assembly that may include at least one first cooling tube and at least one second cooling tube. The forming body may be positioned between the at least one first cooling tube and the at least one second cooling tube such that a long axis of the at least one first cooling tube and a long axis of the at least one second cooling tube are substantially parallel with the first outer forming surface and the second outer forming surface of the forming body, respectively. A first refractory material may be disposed between the at least one first cooling tube and the first outer forming surface of the forming body. The first refractory material may be in direct contact with the at least one first cooling tube thereby forming a first continuous heat conduction pathway between the first refractory material and the at least one first cooling tube in a substantially horizontal direction. A second refractory material may be disposed between the at least one second cooling tube and the second outer forming surface of the forming body. The second refractory material may be in direct contact with the at least one second cooling tube thereby forming a second continuous heat conduction pathway between the second refractory material and the at least one second cooling tube in the substantially horizontal direction. The first continuous heat conduction pathway and the second continuous heat conduction pathway may form a vertical temperature gradient with respect to the forming body.

According to another embodiment, a method for forming a laminated glass ribbon may include directing streams of a molten core glass composition over a first outer forming surface and a second outer forming surface of a lower forming body such that the streams of the molten core glass composition converge and fuse at a root of the lower forming body thereby forming a core layer of the laminated glass ribbon. The method may also include directing streams of a molten cladding glass composition over a first outer forming surface and a second outer forming surface of an upper forming body positioned over the lower forming body such that the streams of the molten cladding glass composition contact the streams of the molten core glass composition thereby forming a first glass cladding layer and a second cladding layer of the laminated glass ribbon. Heat may be extracted from the molten core glass composition flowing over the first outer forming surface and the second outer forming surface of the lower forming body with at least one first cooling tube extending substantially parallel to the first outer forming surface of the lower forming body and at least one second cooling tube extending substantially parallel to the second outer forming surface of the lower forming body. The lower forming body may be disposed between the at least one first cooling tube and the at least one second cooling tube. A first refractory material may be disposed between the at least one first cooling tube and the first outer forming surface of the lower forming body. The first refractory material may be in direct contact with the at least one first cooling tube thereby forming a first continuous heat conduction pathway extending away from the first outer forming surface of the lower forming body in a substantially horizontal direction. A second refractory material may be disposed between the at least one second cooling tube and the second outer forming surface. The second refractory material may be in direct contact with the at least one second cooling tube thereby forming a second continuous heat conduction pathway extending away from the second outer forming surface of the lower forming body in the substantially horizontal direction. The first continuous heat conduction pathway and the second continuous heat conduction pathway may form a vertical temperature gradient between the upper forming body and the lower forming body.

Additional features and advantages of the glass forming apparatuses described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 7 is a thermograph of a modeled fusion forming apparatus according to one or more embodiments shown and described herein.

DETAILED DESCRIPTION

Figure 4:
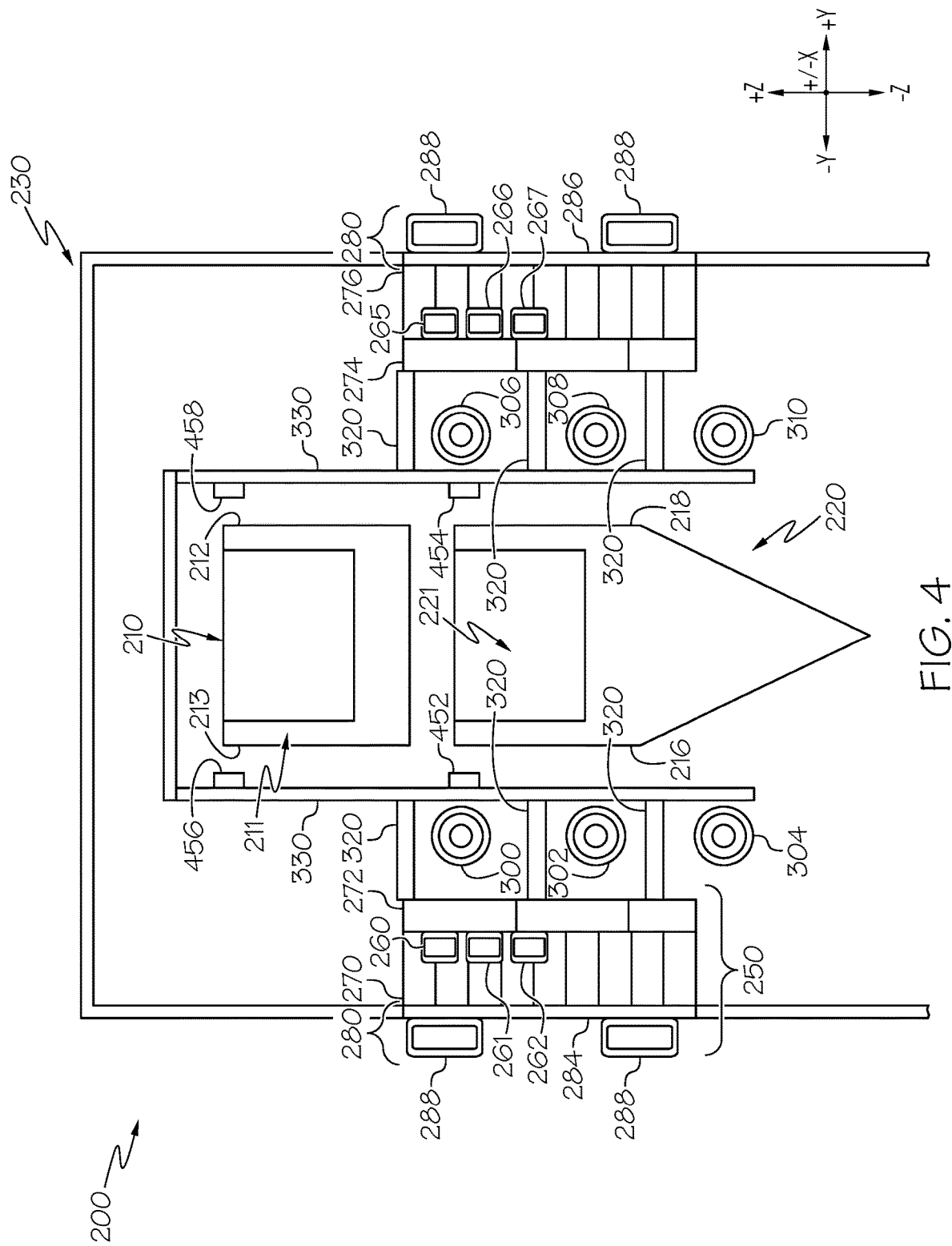
FIG. 4 schematically depicts a cross section of a portion of a fusion forming apparatus according to one or more embodiments shown and described herein.

Reference will now be made in detail to embodiments of glass forming apparatuses and methods for using the same, examples of which are illustrated in the accompanying drawings. Whenever possible, the same reference numerals will be used throughout the drawings to refer to the same or like parts. One embodiment of a portion of a glass forming apparatus is schematically depicted in FIG. 4. The glass forming apparatus generally includes a forming body comprising a first outer forming surface and a second outer forming surface extending in a downward vertical direction. The glass forming apparatus may also include a muffle assembly that may include at least one first cooling tube and at least one second cooling tube. The forming body may be positioned between the at least one first cooling tube and the at least one second cooling tube such that a long axis of the at least one first cooling tube and a long axis of the at least one second cooling tube are substantially parallel with the first outer forming surface and the second outer forming surface of the forming body, respectively. A first refractory material may be disposed between the at least one first cooling tube and the first outer forming surface of the forming body. The first refractory material may be in direct contact with the at least one first cooling tube thereby forming a first continuous heat conduction pathway between the first refractory material and the at least one first cooling tube in a substantially horizontal direction. A second refractory material may be disposed between the at least one second cooling tube and the second outer forming surface of the forming body. The second refractory material may be in direct contact with the at least one second cooling tube thereby forming a second continuous heat conduction pathway between the second refractory material and the at least one second cooling tube in the substantially horizontal direction. The first continuous heat conduction pathway and the second continuous heat conduction pathway may form a vertical temperature gradient with respect to the forming body. Various embodiments of glass forming apparatuses, muffle assemblies for glass forming apparatuses, and methods for using the same will be described herein with specific reference to the appended drawings.

Directional terms as used herein—for example up, down, right, left, front, back, top, bottom, vertical, horizontal—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Figure 1:
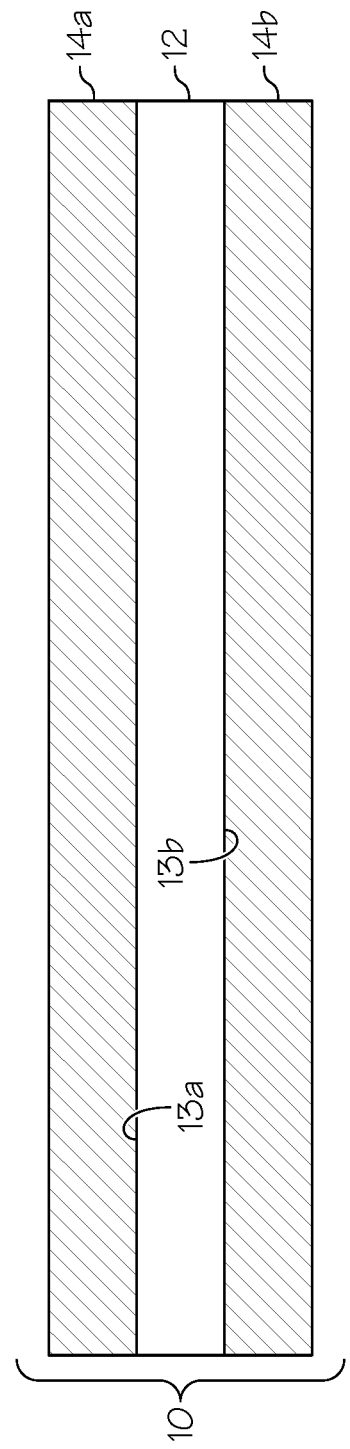
FIG. 1 schematically depicts a cross section of a laminated glass article according to one or more embodiments shown and described herein.

Referring now to FIG. 1, a laminated glass article 10 is schematically depicted in cross section. The laminated glass article 10 generally comprises a glass core layer 12 and a pair of glass cladding layers 14a, 14b. The glass core layer 12 generally comprises a first surface 13a and a second surface 13b which is opposed to the first surface 13a. A first glass cladding layer 14a is fused to the first surface 13a of the glass core layer 12 and a second glass cladding layer 14b is fused to the second surface 13b of the glass core layer 12. The glass cladding layers 14a, 14b are fused to the glass core layer 12 without any additional materials, such as adhesives, coating layers or the like, disposed between the glass core layer 12 and the glass cladding layers 14a, 14b.

In embodiments, the glass core layer 12 of the laminated glass article 10 is formed from a first glass composition having an average core coefficient of thermal expansion $CTE_{core}$ and the glass cladding layers 14a, 14b are formed from a second, different glass composition which has as an average coefficient of thermal expansion $CTE_{clad}$. In these embodiments, the $CTE_{core}$ is greater than $CTE_{clad}$ which results in the glass cladding layers 14a, 14b being compressively stressed without being ion exchanged or thermally tempered.

In alternative embodiments, the glass core layer 12 and the glass cladding layers 14a, 14b may be formed from glass compositions which have approximately the same coefficient of thermal expansion. In these embodiments, the glass composition from which the glass core layer 12 is formed may have different chemical and/or physical properties than the glass composition(s) from which the glass cladding layers 14a, 14b are formed.

Figure 2:
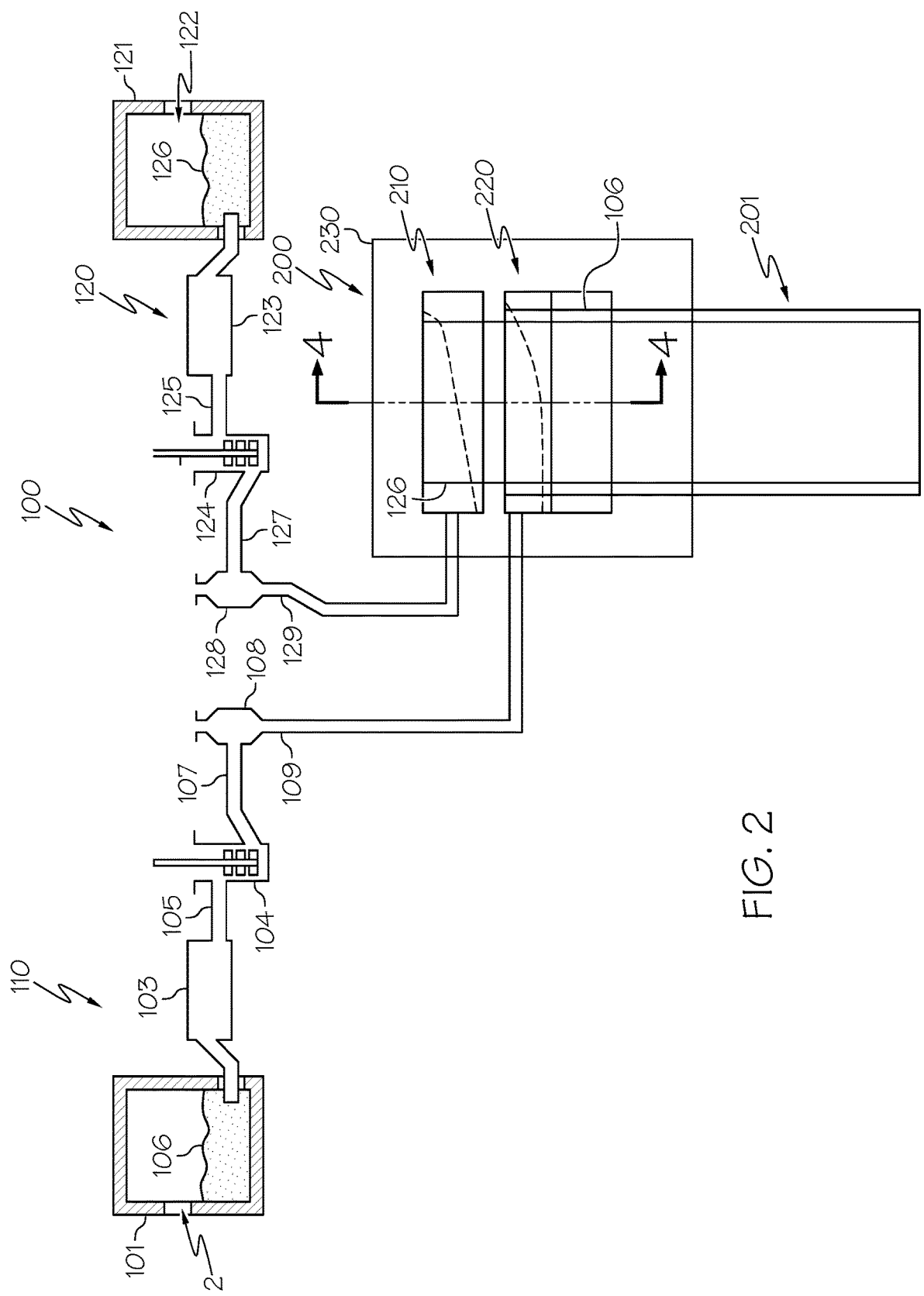
FIG. 2 schematically depicts a glass forming apparatus for forming the laminated glass article of FIG. 1.

The laminated glass article 10 may be formed with a fusion lamination process. One embodiment of a glass forming apparatus 100, specifically a fusion forming apparatus for use with the fusion lamination process, is schematically depicted in FIG. 2. The glass forming apparatus generally comprises a core glass delivery system 110, a cladding glass delivery system 120, and a fusion forming apparatus 200 comprising an upper forming body 210 and a lower forming body 220, both of which are positioned in an enclosure 230.

The core glass delivery system 110 generally includes a core melting vessel 101, a core fining vessel 103, a core mixing vessel 104, a core delivery vessel 108, and a core feed pipe 109 coupled to the lower forming body 220 of the fusion forming apparatus 200. The cladding glass delivery system 120 generally includes a cladding melting vessel 121, a cladding fining vessel 123, a cladding mixing vessel 124, a cladding delivery vessel 128, and a cladding feed pipe 129 coupled to the upper forming body 210.

In operation, core glass batch materials are introduced into the core melting vessel 101 as indicated by arrow 2. The core glass batch materials are melted in the core melting vessel 101 to form a molten core glass composition 106. The molten core glass composition 106 flows into the core fining vessel 103 which has a high temperature processing area that receives the molten core glass composition 106 from the core melting vessel 101. The core fining vessel 103 removes bubbles from the molten core glass composition 106. The core fining vessel 103 is fluidly coupled to the core mixing vessel 104 by a core connecting tube 105. That is, molten core glass composition 106 flowing from the core fining vessel 103 to the core mixing vessel 104 flows through the core connecting tube 105. The core mixing vessel 104 is, in turn, fluidly coupled to the core delivery vessel 108 by a connecting tube 107 such that molten core glass composition flowing from the core mixing vessel 104 to the core delivery vessel 108 flows through the connecting tube 107. The core delivery vessel 108 supplies the molten core glass composition 106 to the lower forming body 220 through core feed pipe 109.

Simultaneously, cladding glass batch materials are introduced into the cladding melting vessel 121 as indicated by arrow 122. The cladding glass batch materials are melted in the cladding melting vessel 121 to form a molten cladding glass composition 126. The cladding fining vessel 123 has a high temperature processing area that receives the molten cladding glass composition 126 from the cladding melting vessel 121. The cladding fining vessel 123 removes bubbles from the molten cladding glass composition 126. The cladding fining vessel 123 is fluidly coupled to the cladding mixing vessel 124 by a cladding connecting tube 125. That is, the molten cladding glass composition flowing from the cladding fining vessel 123 to the cladding mixing vessel 124 flows through the cladding connecting tube 125. The cladding mixing vessel 124 is, in turn, fluidly coupled to the cladding delivery vessel 128 by a connecting tube 127 such that the molten cladding glass composition 126 flowing from the cladding mixing vessel 124 to the cladding delivery vessel 128 flows through the connecting tube 127. The cladding delivery vessel 128 supplies the molten cladding glass composition 126 to the upper forming body 210 through the cladding feed pipe 129.

Figure 3:
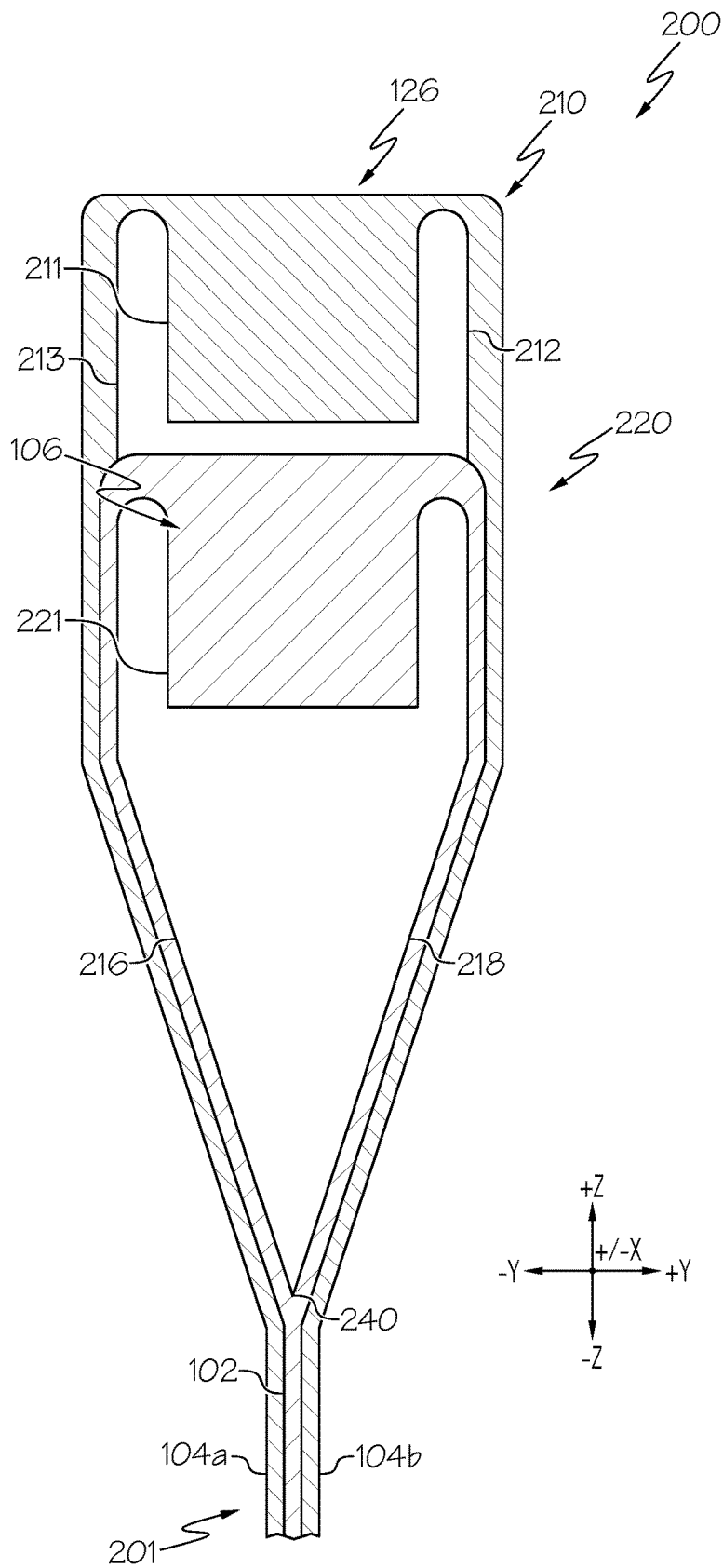
FIG. 3 schematically depicts a cross section of a portion of the glass forming apparatus of FIG. 2.

Referring now to FIGS. 2 and 3, FIG. 3 schematically depicts a cross section of the fusion forming apparatus 200 for forming a laminated glass article, specifically a laminated glass ribbon. The fusion forming apparatus 200 includes an upper forming body 210 which is positioned over a lower forming body 220. The upper forming body 210 includes a trough 211 into which the molten cladding glass composition 126 is fed from the cladding delivery vessel 128 (FIG. 2). Similarly, the lower forming body 220 includes a trough 221 into which the molten core glass composition 106 is fed from the core delivery vessel 108 (FIG. 2).

As the molten core glass composition 106 fills the trough 221, the streams of the molten core glass composition 106 overflow the trough 221 and are directed over the outer forming surfaces 216, 218 (i.e., the first outer forming surface 216 and the second outer forming surface 218) of the lower forming body 220. The outer forming surfaces 216, 218 of the lower forming body 220 generally extend in a downward vertical direction (i.e., the −Z direction of the coordinate axes depicted in FIG. 3) from the top of the trough 221 and converge at a root 240. The molten core glass composition 106 flowing over the outer forming surfaces 216, 218 rejoins and fuses at the root 240 of the lower forming body 220 thereby forming a glass core layer 102 of a laminated glass ribbon 201.

Simultaneously, streams of the molten cladding glass composition 126 overflow the trough 211 formed in the upper forming body 210 and are directed over outer forming surfaces 212, 213 (i.e., the first outer forming surface 212 and the second outer forming surface 213) of the upper forming body 210 which, like the outer forming surfaces 216, 218 of the lower forming body 220, generally extend in a downward vertical direction. However, unlike the outer forming surfaces 216, 218 of the lower forming body 229, the outer forming surfaces 212, 213 do not converge but, instead, are substantially parallel with one another. The streams of the molten cladding glass composition 126 flow around the lower forming body 220 and contact respective streams of the molten core glass composition 106 flowing over the outer forming surfaces 216, 218 of the lower forming body 220, fusing to the molten core glass composition and forming glass cladding layers 104a, 104b around the glass core layer 102. The resulting laminated glass ribbon 201 is drawn downward (i.e., in the −Z direction of the coordinate axes depicted in FIG. 3) where the laminated glass ribbon is further cooled, solidified, and processed.

Still referring to FIGS. 2 and 3, it has been found that a temperature gradient between the trough 211 of the upper forming body 210 and the trough 221 of the lower forming body 220 may be beneficial to achieve a laminated glass ribbon with certain properties such as, for example, certain thickness ratios between the glass core layer and the glass cladding layers of the laminated glass ribbon. Specifically, it has been found that reducing the power to heating elements (not shown) adjacent to the lower forming body 220 and/or the upper forming body 210 may not be sufficient to generate a temperature gradient for certain glass pairings. As such, it has been found that additional cooling may be beneficial. However, it has also been found that existing cooling techniques may only yield a temperature gradient of about 5° C. when the actual temperature gradient desired is on the order of 100° C. or more. Similarly, for some glass core/glass cladding pairings, there may be a desire to establish a negative temperature gradient between the trough 211 of the upper forming body 210 and the trough 221 of the lower forming body 220. The embodiments of glass forming apparatuses described herein include muffle assemblies with cooling tubes which may be used to achieve the desired temperature gradients between the troughs of the upper and lower forming bodies.

Referring now to FIG. 4, a cross section of a portion of one embodiment of a fusion forming apparatus 200 is schematically depicted. The fusion forming apparatus 200 includes an upper forming body 210 positioned over and spaced apart from a lower forming body 220 in the upward vertical direction (i.e., the +Z-direction of the coordinate axes depicted in FIG. 4) as described herein with respect to FIG. 3. The upper forming body 210 and the lower forming body 220 are positioned in an enclosure 230, as described hereinabove with respect to FIG. 2. In the embodiments described herein, at least a portion of the enclosure 230 comprises a muffle assembly 250. The muffle assembly 250 is disposed around at least one of the upper forming body 210 and the lower forming body 220 and includes at least one first cooling tube 260 and at least one second cooling tube 265 which are used to regulate the extraction of heat from glass proximate the trough 211 of the upper forming body 210 and/or the trough 221 of the lower forming body 220 to thereby establish a temperature gradient between the trough 211 of the upper forming body 210 and the trough 221 of the lower forming body 220.

In the embodiment of the fusion forming apparatus 200 depicted in FIG. 4, the muffle assembly 250 is disposed around the lower forming body 220 and includes a muffle frame 280, the at least one first cooling tube 260, the at least one second cooling tube 265, and a plurality of refractory materials 270, 272, 274, 276 disposed between the lower forming body 220 and the muffle frame 280.

Figure 5:
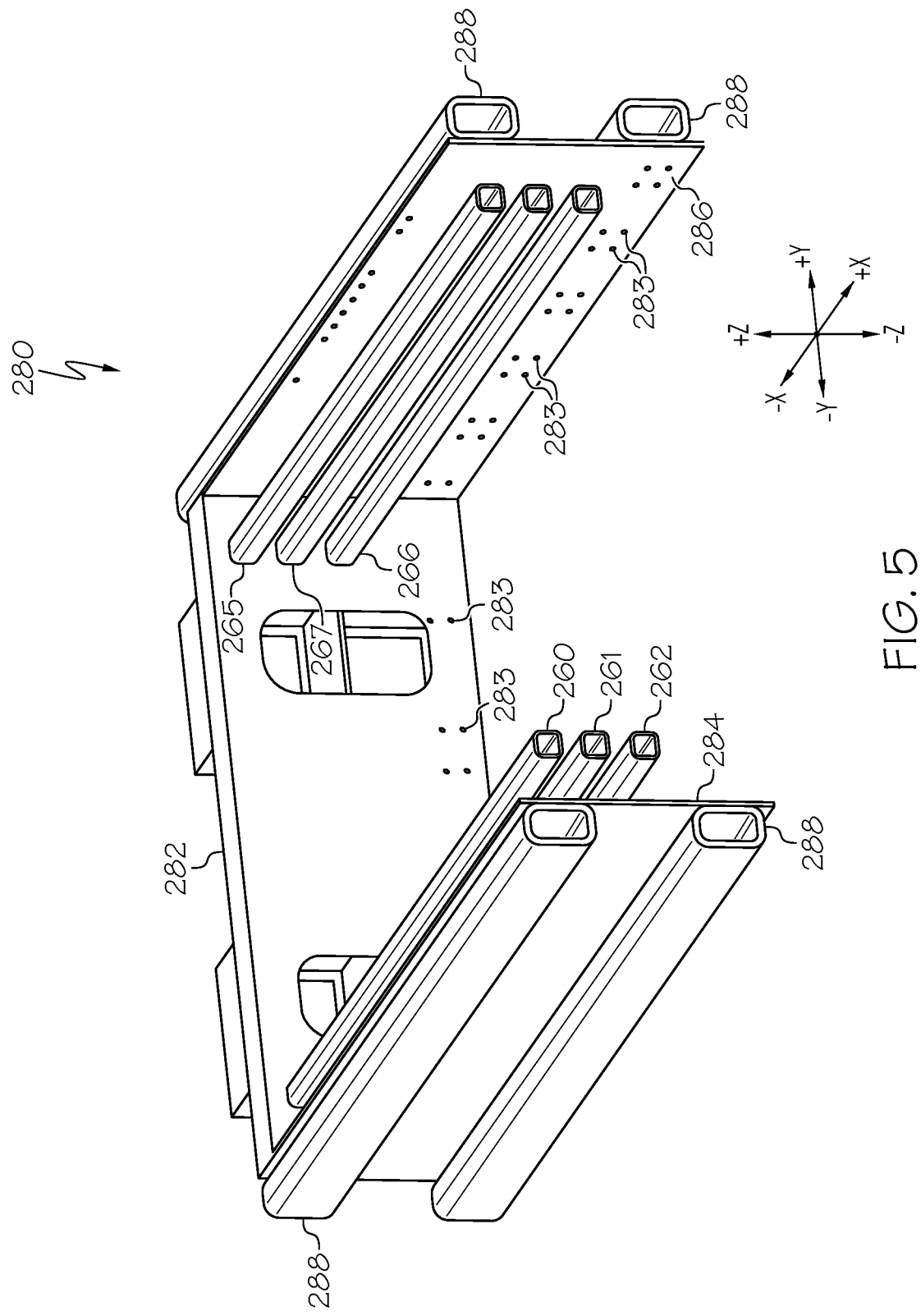
FIG. 5 schematically depicts an isometric view of a portion of a muffle frame, according to one or more embodiments shown and described herein.

Referring to FIGS. 4 and 5, the muffle frame 280 forms a part of the enclosure 230 and is generally constructed of load bearing material such as, for example, structural steel or the like. The muffle frame 280 has a closed-loop structure such that the muffle frame 280 extends around the lower forming body 220. The muffle frame 280 provides structure to the enclosure 230 and also supports various other components of the fusion forming apparatus 200 including, without limitation, the at least one first cooling tube 260, the at least one second cooling tube 265, and the plurality of refractory materials 270, 272, 274, 276.

In the embodiment of the muffle frame 280 depicted in FIG. 5, the muffle frame 280 generally includes a back wall 282, a front wall (not shown) opposite the back wall 282, and a pair of sidewalls 284, 286 which join the back wall 282 to the front wall. The back wall 282, front wall, and sidewalls 284, 286 may generally be formed from plates of structural steel or a similar structural material. In embodiments, the back wall 282, front wall, and sidewalls 284, 286 may include a variety of attachment points 283, such as fastener holes or the like, that may be used to attach various support brackets (not shown) to the muffle frame 280. These support brackets may be used to support, for example, the plurality of refractory materials 270, 272, 274, 276 and/or other portions of the fusion forming apparatus 200.

In embodiments, the muffle frame 280 may further include one or more structural members 288 which are attached to the back wall 282, front wall, and sidewalls 284, 286 of the muffle frame 280. In embodiments, the structural members 288 may be formed as hollow beams or tubes which provide additional structural support to the back wall 282, front wall, and sidewalls 284, 286 of the muffle frame 280. Like the back wall 282, front wall, and sidewalls 284, 286, the structural members 288 may be formed from load bearing materials such as, for example, structural steel.

Still referring to FIGS. 4 and 5, the at least one first cooling tube 260 extends through the back wall 282 and the front wall of the muffle frame 280. Similarly, the at least one second cooling tube 265 extends through the back wall 282 and the front wall of the muffle frame 280. More specifically, the at least one first cooling tube 260 generally extends in a lateral direction (i.e., in the +/−X-direction of the coordinate axes depicted in FIGS. 4 and 5) across the muffle frame 280 and is substantially parallel with the sidewall 284 of the muffle frame 280. The at least one second cooling tube 265 is spaced apart from the second cooling tube in a longitudinal direction (i.e., in the +/−Y direction of the coordinate axes depicted in FIGS. 4 and 5) and generally extends in the lateral direction across the muffle frame 280 and is substantially parallel with the sidewall 286 of the muffle frame 280. Accordingly, it should be understood that the at least one first cooling tube 260 and the at least one second cooling tube 265 are substantially parallel with one another. In the embodiment shown in FIG. 5, the at least one first cooling tube 260 and the at least one second cooling tube 265 are positioned on opposite sides of the lower forming body 220 such that the long axis of the at least one first cooling tube 260 and a long axis of the at least one second cooling tube 265 are opposed to and substantially parallel with the first outer forming surface 216 and the second outer forming surface 218 of the lower forming body 220, respectively.

In the embodiment of the fusion forming apparatus 200 depicted in FIG. 4, the at least one first cooling tube 260 and the at least one second cooling tube 265 are positioned relative to the lower forming body 220 at an elevation along the +/−Z-direction suitable for extracting heat from the molten core glass composition present in the trough 221 of the lower forming body 220 and/or from the molten core glass composition as it overflows the trough 221 of the lower forming body 220 and begins to flow down the outer forming surfaces 216, 218 of the lower forming body 220. Positioning the at least one first cooling tube 260 and the at least on second cooling tube 265 at such an elevation allows for a temperature gradient to be achieved between the molten cladding glass composition in the trough 211 of the upper forming body 210 and the molten core glass composition in the trough 221 of the lower forming body 220. Additionally, or alternatively, positioning the at least one first cooling tube 260 and the at least one second cooling tube 265 at such an elevation enables a temperature gradient within the enclosure 230 in the vertical direction (i.e., in the +/−Z-direction of the coordinate axes depicted in FIGS. 4 and 5).

In embodiments, the at least one first cooling tube 260 may be a first plurality of cooling tubes 260, 261, 262. Each of the cooling tubes 260, 261, 262 may be oriented in parallel with one another as depicted in FIGS. 4 and 5. Similarly, the at least one second cooling tube 265 may be a second plurality of cooling tubes 265, 266, 267. Each of the cooling tubes 265, 266, 267 may be oriented in parallel with one another. While FIGS. 4 and 5 depict the first plurality of cooling tubes and the second plurality of cooling tubes as comprising three cooling tubes respectively, it should be understood that the first and second plurality of cooling tubes may have more or less than three cooling tubes.

In the embodiments described herein, the at least one first cooling tube 260 and the at least one second cooling tube 265 are hollow conduits that are formed from a material suitable for use at high temperatures such as, for example, temperatures in excess of 1000° C. In embodiments, the at least one first cooling tube 260 and the at least one second cooling tube 265 are formed from stainless steel such as, for example and without limitation, 304 stainless steel or a similar austenitic stainless steel. In some embodiments, the at least one first cooling tube 260 and the at least one second cooling tube 265 may be coated with a high emissivity coating to aid in the heat extraction efficiency of the cooling tubes. For example, in some embodiments, the at least one first cooling tube 260 and the at least one second cooling tube 265 may be coated with a coating having an emissivity e that is greater than or equal to 0.9 or even greater than or equal to 0.95 at the operating temperatures of the fusion forming apparatus 200. In one particular embodiment, the at least one first cooling tube 260 and the at least one second cooling tube 265 may be coated with M-720 high emissivity coating manufactured by Cetek, Inc. of Poughkeepsie, N.Y. However, it should be understood that other high emissivity coatings are contemplated and possible.

Referring again to FIG. 4, the muffle assembly 250 further comprises refractory material 272, 274 (i.e., first refractory material 272 and second refractory material 274) positioned between the at least one first cooling tube 260 and the first outer forming surface 216 of the lower forming body and between the at least one second cooling tube 265 and the outer forming surfaces 218 of the lower forming body 220. In embodiments, the refractory material 272, 274 may be in the form of refractory blocks which are attached to or otherwise supported by the muffle frame 280. In embodiments, the refractory material 272, 274 may be NA-33 HF refractory blocks produced by ANH Refractories. However, it should be understood that other refractory materials are contemplated and possible.

In the embodiments described herein, the first refractory material 272 is disposed between the at least one first cooling tube 260 and the first outer forming surface 216 of the lower forming body 220 such that the first refractory material 272 is in direct contact with the at least one first cooling tube 260. Accordingly, it should be understood that the first refractory material 272 is disposed within the closed-loop of the muffle frame 280 between the at least one first cooling 260 and the at least one second cooling tube 265. Direct contact between the first refractory material 272 and the at least one first cooling tube 260 (i.e., without any air gaps therebetween) forms a first continuous heat conduction pathway between the first refractory material 272 and the at least one first cooling tube 260 extending away from the first outer forming surface 216 of the lower forming body 220 in a substantially horizontal direction (i.e., in the X-Y plane of the coordinate axes depicted in FIG. 4). This first continuous heat conduction pathway allows for the efficient extraction of heat from the enclosure 230 surrounding the fusion forming apparatus 200 and, more specifically, the efficient extraction of heat from the molten core glass composition in the trough 221 of the lower forming body 220.

In a similar manner, the second refractory material 274 is disposed between the at least one second cooling tube 265 and the second outer forming surface 218 of the lower forming body 220 such that the refractory material 274 is in direct contact with the at least one second cooling tube 265. Accordingly, it should be understood that the second refractory material 274 is disposed within the closed-loop of the muffle frame 280 between the at least one first cooling tube 260 and the at least one second cooling tube 265. Direct contact between the second refractory material 274 and the at least one second cooling tube 265 (i.e., without any air gaps therebetween) forms a second continuous heat conduction pathway between the second refractory material 274 and the at least one second cooling tube 265 extending away from the second outer forming surface 218 of the lower forming body 220 in a substantially horizontal direction (i.e., in the X-Y plane of the coordinate axes depicted in FIG. 4). This second continuous heat conduction pathway allows for the efficient extraction of heat from the enclosure 230 surrounding the fusion forming apparatus 200 and, more specifically, the efficient extraction of heat from the molten core glass composition in the trough 221 of the lower forming body 220.

Still referring to FIG. 4, in some embodiments, the muffle assembly 250 further comprises refractory material 270, 276 (i.e., first refractory material 270 and second refractory material 276) positioned between the at least one first cooling tube 260 and the muffle frame 280 and between the at least one second cooling tube 265 and the muffle frame 280. In embodiments, the refractory material 270, 276 may be in the form of refractory blocks which are attached to or otherwise supported by the muffle frame 280. In embodiments, the refractory material 270, 276 may be, for example, a refractory material which has a high thermal conductivity. Utilizing a refractory material 270, 276 which has a high thermal conductivity between the at least one first cooling tube 260 and the muffle frame 280 and between the at least one second cooling tube 265 and the muffle frame 280 further enhances the extraction of heat from the enclosure 230 surrounding the fusion forming apparatus 200 and, more specifically, the efficient extraction of heat from the molten core glass composition in the trough 221 of the lower forming body 220. That is, the refractory material 270, 276 with a high thermal conductivity may assist in dissipating heat conveyed from the lower forming body 220 along the first and second continuous heat conduction pathways to the at least one first cooling tube 260 and the at least one second cooling tube 265. In embodiments, the refractory material 270, 276 may be Tamax refractory blocks produced by ANH Refractories. However, it should be understood that other refractory materials are contemplated and possible.

In the embodiments described herein, the first refractory material 270 is disposed between the at least one first cooling tube 260 and the muffle frame 280 such that the refractory material 270 is in direct contact with the at least one first cooling tube 260. In embodiments, the at least one first cooling tube 260 is embedded within the first refractory material 270 and the first refractory material 272. Direct contact between the first refractory material 270 and the at least one first cooling tube 260 (i.e., without any air gaps therebetween) forms a continuous heat conduction pathway between the at least one first cooling tube 260 and the first refractory material 270 extending away from the at least one first cooling tube 260 in the substantially horizontal direction. This continuous heat conduction pathway allows for the dissipation of heat extracted from the molten core glass composition in the trough 221 of the lower forming body 220.

In a similar manner, the second refractory material 276 is disposed between the at least one second cooling tube 265 and the muffle frame 280 such that the second refractory material 274 is in direct contact with the at least one second cooling tube 265. In embodiments, the at least one second cooling tube 265 is embedded within the second refractory material 276 and the second refractory material 274. Direct contact between the second refractory material 276 and the at least one first cooling tube 260 (i.e., without any air gaps therebetween) forms a continuous heat conduction pathway between the second refractory material 276 and the at least one second cooling tube 265 extending away from the at least one second cooling tube 265. This continuous heat conduction pathway allows for the dissipation of heat extracted from the molten core glass composition in the trough 221 of the lower forming body 220.

In embodiments, the at least one first cooling tube 260 and the at least one second cooling tube 265 are permanently attached to the muffle frame 280 and/or the refractory material 270, 272, 274, 276. For example, in one embodiment, the at least one first cooling tube 260 and the at least one second cooling tube may be bonded to the corresponding refractory material 270, 272, 274, 276. In some embodiments, the at least one first cooling tube 260 may be bonded to the refractory material 272 and the refractory material 270 and the at least one second cooling tube 265 may be bonded to the refractory material 274 and the refractory material 276 with a refractory cement such as, for example and without limitation, Super 3000 refractory cement. In these embodiments, the refractory cement forms a part of the refractory material 270, 272, 274, 276 and, as such, is a part of the continuous heat conduction pathway between the refractory material 270, 272, 274, 276 and the corresponding cooling tubes. Alternatively or additionally, the at least one first cooling tube 260 and the at least one second cooling tube 265 may be affixed to the muffle frame 280 such as by welding or the like.

In alternative embodiments, the at least one first cooling tube 260 and the at least one second cooling tube 265 are removably engaged with the muffle frame 280 and the corresponding refractory material 270, 272, 274, 276 such that the at least one first cooling tube 260 and the at least one second cooling tube 265 may be removed from the muffle assembly 250 to allow for increased flexibility with respect to the extraction of heat from the fusion forming apparatus 200.

Figure 6:
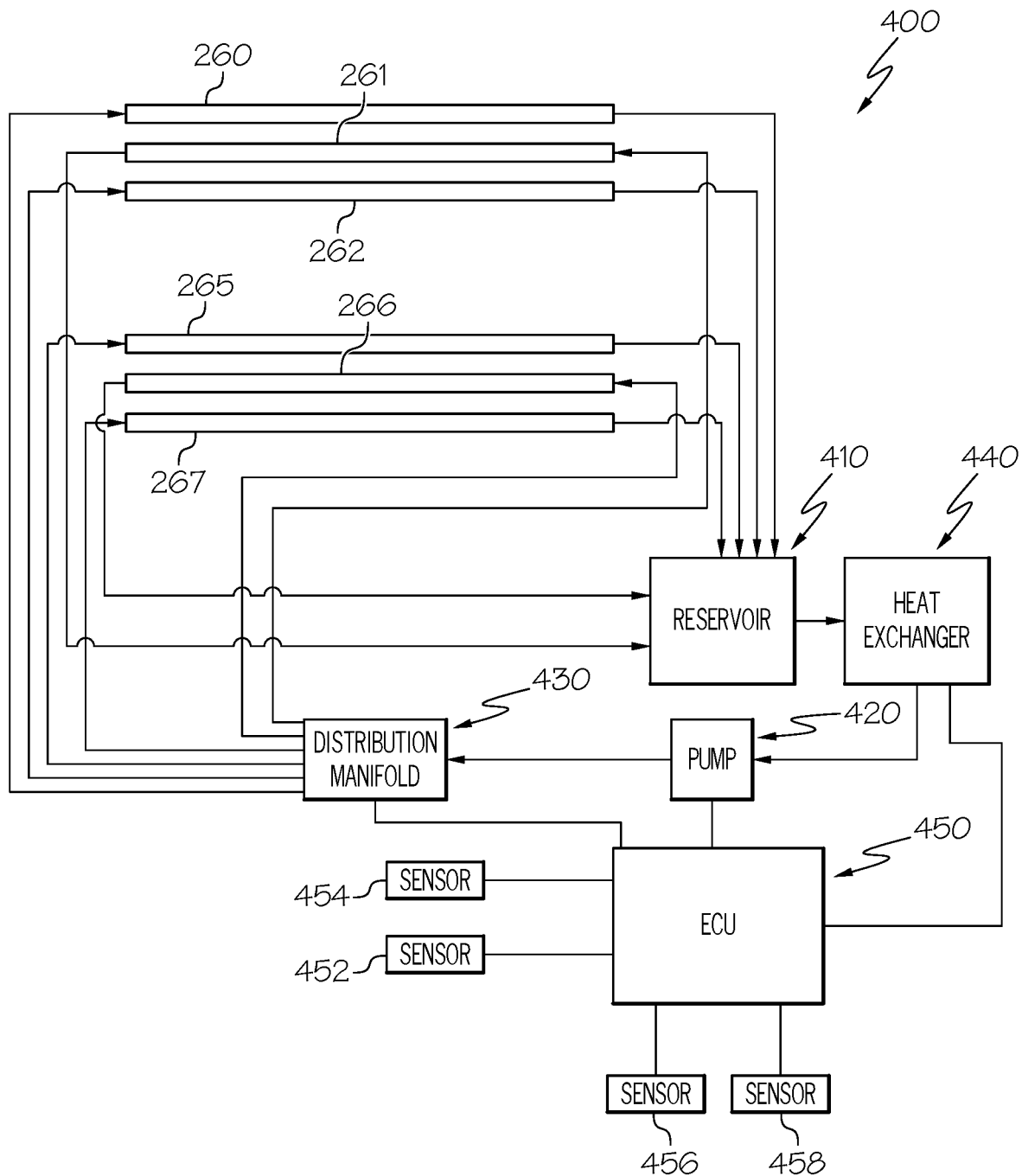
FIG. 6 schematically depicts a fluid circulation system according to one or more embodiments shown and described herein.

Referring now to FIGS. 4 and 6, in embodiments, the at least one first cooling tube 260 and the at least one second cooling tube 265 may be fluidly coupled to a fluid circulation system 400. The fluid circulation system 400 may be used to regulate the flow and/or temperature of cooling fluid through the at least one first cooling tube 260 and the at least one second cooling tube 265 and, in turn, the amount of heat extracted from the lower forming body 220. In the embodiments described herein, the fluid circulation system 400 generally includes a fluid reservoir 410, a pump 420, a distribution manifold 430, and a heat exchanger 440. In some embodiments, the fluid circulation system 400 may further include an electronic control unit (ECU) 450 and one or more temperature sensors 452, 454, 456, 458.

In the embodiments described herein, the fluid reservoir 410 is a containment vessel suitable for storing the cooling fluid. In embodiments, the cooling fluid may be a liquid, a gas, or a combination of a liquid and a gas. Suitable liquids include, without limitation, water and/or a liquid coolant. Suitable gases include, without limitation, air, helium, and the like. The fluid reservoir 410 is fluidly coupled to a heat exchanger 440 and, in turn, to a pump 420 and the distribution manifold 430. In embodiments, the heat exchanger 440 may be, for example, a plate-frame type heat exchanger which extracts heat from the cooling fluid, thereby decreasing a temperature of the cooling fluid to a specified target temperature before the cooling fluid is pumped to the cooling tubes.

The pump 420 pumps the cooling fluid from the heat exchanger 440 into the at least one first cooling tube 260 and the at least one second cooling tube 265 through the distribution manifold 430. In embodiments, the distribution manifold 430 is fluidly coupled to the at least one first cooling tube 260 and the at least one second cooling tube 265 such that cooling fluid flowing through adjacent cooling tubes flows in opposite directions. For example, in embodiments in which the at least one first cooling tube comprises a first plurality of cooling tubes 260, 261, 262 and the at least one second cooling tube comprises a second plurality of cooling tubes 265, 266, 267, as depicted in FIG. 6, this arrangement facilitates uniform cooling of the forming body in a lateral direction of the forming body (i.e., in the +/−X-direction of the coordinate axes depicted in FIG. 4).

More specifically, the cooling fluid will generally have a lower temperature as it enters the cooling tubes and a higher temperature as it exits the cooling tubes as the cooling fluid extracts heat from the forming body as it passes through the cooling tubes. Accordingly, by arranging the first plurality of cooling tubes 260, 261, 262, the second plurality of cooling tubes 265, 266, 267, and the distribution manifold 430 such that cooling fluid flowing through adjacent cooling tubes flows in opposite directions, a build-up of heat at one end of the forming body is avoided and a more even temperature distribution is provided across the forming body in a lateral direction.

The at least one first cooling tube 260 and the at least one second cooling tube 265 are also fluidly coupled to the fluid reservoir 410 such that cooling fluid exiting the at least one first cooling tube 260 and the at least one second cooling tube 265 is directed into the fluid reservoir 410 for recirculation.

In embodiments, the fluid circulation system 400 may further include an electronic control unit 450. The electronic control unit 450 may include a processor and a memory storing computer readable and executable instructions which, when executed by the processor, controls the flow of cooling fluid through the fluid circulation system 400. For example, in some embodiments, the electronic control unit 450 may be communicatively coupled to the pump 420 such that the electronic control unit 450 regulates the volume of cooling fluid which is pumped through the at least one first cooling tube 260 and the at least one second cooling tube 265 and, as such, the amount of heat extracted from the forming body with the cooling tubes.

In some embodiments, the electronic control unit 450 may also be communicatively coupled to the distribution manifold 430 such that the electronic control unit 450 regulates the flow of cooling fluid through the at least one first cooling tube 260 and the at least one second cooling tube 265.

In some embodiments, the electronic control unit 450 may also be communicatively coupled to the heat exchanger 440 such that the electronic control unit 450 regulates the temperature of the cooling fluid and, as such, the amount of heat extracted from the forming body with the cooling tubes.

In some embodiments described herein, the fluid circulation system 400 may be operated with a closed-loop control scheme. For example, in some embodiments the fluid circulation system 400 may further include temperature sensors 452, 454, 456, 458 which are communicatively coupled to the electronic control unit 450. The temperature sensors 452, 454, 456, 458 may be positioned in the enclosure 230 (FIG. 4) of the fusion forming apparatus 200 (FIG. 4) at locations suitable for measuring the temperature of the forming bodies and/or glass proximate the trough of each forming body.

Referring to FIGS. 4 and 6 by way of example, in the embodiment of the fusion forming apparatus 200 depicted in FIG. 4, the temperature sensor 452 may be positioned proximate the top of the first outer forming surface 216 of the lower forming body 220 near the trough 221 while the temperature sensor 454 may be positioned proximate the top of the second outer forming surface 218 of the lower forming body 220 near the trough 221. Similarly, the temperature sensor 456 may be positioned proximate the top of outer forming surface 213 of the upper forming body 210 near the trough 211 while the temperature sensor 458 may be positioned proximate the top of outer forming surface 212 of the upper forming body 210 near the trough 211. Based on the temperatures received from temperature sensors 452, 454, 456, and 458, the electronic control unit 450 may regulate the flow of cooling fluid through the at least one first cooling tube 260 and the at least one second cooling tube 265 in order to achieve a pre-determined temperature gradient between the trough 211 of the upper forming body 210 and the trough 221 of the lower forming body 220. For examples, based on the temperatures received from temperature sensors 452, 454, 456, and 458, the electronic control unit 450 may: direct the pump 420 to increase or decrease the volume of cooling fluid flowing through the at least one first cooling tube 260 and the at least one second cooling tube 265; increase or decrease the temperature of the cooling fluid with the heat exchanger 440; restrict the flow of cooling fluid to certain ones of the at least one first cooling tube 260 and the at least one second cooling tube 265 with the distribution manifold 430; and/or various combinations thereof in order to achieve and/or maintain a desired temperature gradient between the trough 211 of the upper forming body 210 and the trough 221 of the lower forming body 220.

Referring again to FIG. 4, in the embodiments described herein, the first refractory material 272 is spaced apart from the first outer forming surface 216 of the lower forming body 220 and the second refractory material 274 is spaced apart from the second outer forming surface 218 of the lower forming body 220. In these embodiments, at least one heating element may be disposed between the first refractory material 272 and the first outer forming surface 216 of the lower forming body 220. Similarly, at least one heating element may be disposed between the second refractory material 274 and the second outer forming surface 218 of the lower forming body 220.

For example, the fusion forming apparatus 200 may further comprise a first plurality of heating elements 300, 302, 304 positioned between the muffle assembly 250 and the first outer forming surface 216 of the lower forming body 220, each of the heating elements 300, 302, 304 being arranged at a different elevation along the +/−Z-direction. The fusion forming apparatus 200 may further comprise a second plurality of heating elements 306, 308, 310 positioned between the muffle assembly 250 and the second outer forming surface 218 of the lower forming body 220, each of the heating elements 306, 308, 310 being arranged at a different elevation along the +/−Z-direction. Each of the heating elements of the first plurality of heating elements 300, 302, 304 and each of the heating elements in the second plurality of heating elements 306, 308, 310 generally extend in the lateral direction (i.e., the +/−X-direction of the coordinate axes depicted in FIG. 4) to enable heating of the streams of molten glass directed over the outer forming surfaces 216, 218 of the lower forming body 220. Thermal shields 320 may be arranged between vertically adjacent heating elements of the first plurality of heating elements 300, 302, 304 and the second plurality of heating elements 306, 308, 310 to thermally isolate vertically adjacent heating elements from one another. In addition, a thermally conductive enclosure 330 may be disposed between the first plurality of heating elements 300, 302, 304 and the first outer forming surface 216 of the lower forming body 220 and between the second plurality of heating elements 306, 308, 310 and the second outer forming surface 218 of the lower forming body 220. The thermally conductive enclosure 330 physically isolates the heating elements from the molten glass directed over the lower forming body 220 while still conducting heat from the heating elements to the molten glass. In embodiments, the thermally conductive enclosure 330 may be formed from, for example, silicon carbide or a similar thermally conductive material.

Referring now to FIGS. 3-4 and 6, in operation, the molten core glass composition 106 fills the trough 221 of the lower forming body 220 and streams of the molten core glass composition 106 overflow the trough 221 and are directed over the first outer forming surface 216 and the second outer forming surface 218 of the lower forming body 220. The molten core glass composition 106 flowing over the outer forming surfaces 216, 218 rejoins and fuses at the root 240 of the lower forming body 220 thereby forming a glass core layer 102 of a laminated glass ribbon 201.

Simultaneously, streams of the molten cladding glass composition 126 overflow the trough 211 formed in the upper forming body 210 and are directed over the first outer forming surface 212 and the second outer forming surface 213 of the upper forming body 210. The streams of the molten cladding glass composition 126 flow around the lower forming body 220 and contact respective streams of the molten core glass composition 106 flowing over the outer forming surfaces 216, 218 of the lower forming body 220, fusing to the molten core glass composition and forming glass cladding layers 104a, 104b around the glass core layer 102.

As the molten core glass composition 106 flows over the outer forming surfaces 216, 218 of the lower forming body 220 and the molten cladding glass composition 126 flows over the outer forming surfaces 212, 213 of the upper forming body 210, cooling fluid is directed through the at least one first cooling tube 260 and the at least one second cooling tube 265 with the pump 420 of the fluid circulation system 400 to extract heat from the molten core glass composition 106 in the trough 221 of the lower forming body 220 and the molten core glass composition 106 flowing over the outer forming surfaces 216, 218 of the lower forming body 220.

Specifically, the cooling fluid flowing through the at least one first cooling tube 260 and the at least one second cooling tube 265 draws heat from the molten core glass composition 106 in a horizontal direction through the first refractory material 272 and the second refractory material 274, respectively. This heat is carried away from the lower forming body 220 in a lateral direction by the cooling fluid flowing through the at least one first cooling tube 260 and the at least one second cooling tube 265, thereby establishing a temperature gradient between the trough 221 of the lower forming body 220 and the trough 211 of the upper forming body 210. In embodiments, a portion of the heat carried by the cooling fluid in the at least one first cooling tube 260 and the at least one second cooling tube 265 is further dissipated by the refractory materials 270, 276 that are positioned in direct contact with the at least one first cooling tube 260 and the at least one second cooling tube 265.

In embodiments, the cooling fluid flowing through the at least one first cooling tube 260 and the at least on second cooling tube 265 is passed to the fluid reservoir 410 where the cooling fluid is held and, subsequently, re-circulated through the heat exchanger 440 of the fluid circulation system 400 where the cooling fluid is cooled. Thereafter, the cooling fluid is re-circulated through the at least one first cooling tube 260 and the at least one second cooling tube 265 with the pump 420.

In embodiments, the fluid circulation system 400 may regulate the temperature gradient between the trough 221 of the lower forming body 220 and the trough 211 of the upper forming body 210 by controlling the flow rate and/or flow volume of cooling fluid through the at least one first cooling tube 260 and the at least one second cooling tube 265 with the pump 420, controlling the temperature of the cooling fluid flowing through the at least one first cooling tube 260 and the at least one second cooling tube 265 with the heat exchanger 440, and/or selectively directing the cooling fluid through the at least one first cooling tube 260 and the at least one second cooling tube 265.

For example and without limitation, in embodiments, the electronic control unit 450 of the fluid circulation system 400 may direct a flow of cooling fluid through each of the at least one first cooling tube 260 and the at least one second cooling tube 265 at a rate from about 5 gallons (18.9 liters) per minute to about 10 gallons (37.9 liters) per minute with the flow rate being varied within this range to achieve a desired temperature gradient. Alternatively or additionally, the electronic control unit 450 of the fluid circulation system 400 may maintain the temperature of the cooling fluid being pumped to the at least one first cooling tube 260 and the at least one second cooling tube 265 in a range from about 30° C. to about 35° C., with the temperature being varied within this range to achieve a desired temperature gradient. Alternatively or additionally, the electronic control unit 450 of the fluid circulation system 400 may selectively control the flow of cooling fluid to the at least one first cooling tube 260 and the at least one second cooling tube 265 with the distribution manifold 430 to achieve a desired temperature gradient. As noted hereinabove, control of the temperature gradient may be based, at least in part, on temperature feedback received by the electronic control unit 450 from the temperature sensors 452, 454, 456, and 458.

In the embodiment of the fusion forming apparatus 400 depicted in FIG. 4, the muffle assembly 250 with the at least one first cooling tube 260 and the at least one second cooling tube 265 may be used to establish a temperature gradient of greater than 100° C. between the trough 221 of the lower forming body 220 and the trough 211 of the upper forming body 210. That is, the molten core glass composition 106 in the trough 221 of the lower forming body 220 may have a temperature that is 100° C. less than the temperature of the molten cladding glass composition 126 in the trough 211 of the upper forming body 210. In some embodiments, the temperature gradient between the trough 221 of the lower forming body 220 and the trough 211 of the upper forming body 210 may be in a range from greater than or equal to 115° C. or even 120° C. to less than or equal to 140° C.

While the embodiment of the fusion forming apparatus 200 depicted in FIG. 4 shows the muffle assembly 250 with the cooling tubes positioned around the lower forming body 220, it should be understood that other embodiments are contemplated and possible. For example, in one embodiment (not shown), the fusion forming apparatus may be constructed such that the muffle assembly with the cooling tubes is positioned around the upper forming body. In this embodiment, the muffle assembly with the cooling tubes may be utilized to create a negative temperature gradient between the trough of the upper forming body and the trough of the lower forming body (i.e., the muffle assembly is used to cool the upper forming body and the molten glass in the trough of the upper forming body such that the molten glass in the trough of the upper forming body has a lower temperature than the molten glass in the trough of the lower forming body). In this embodiment, the muffle assembly may be used to establish a negative temperature gradient of greater than 60° C. between the trough of the lower forming body and the trough of the upper forming body. That is, the molten core glass composition in the trough of the lower forming body may have a temperature that is 60° C. greater than the temperature of the molten cladding glass composition in the trough of the upper forming body. In some embodiments, the negative temperature gradient between the trough of the lower forming body and the trough of the upper forming body may be in a range from greater than or equal to 70° C. to less than or equal to 100° C.

In still other embodiments, the fusion forming apparatus may be constructed such that a first muffle assembly with cooling tubes is positioned around the upper forming body and a second muffle assembly with cooling tubes is positioned around the lower forming body. This configuration of the fusion forming apparatus may permit the enhanced control over the temperature gradient between the trough of the upper forming body and the trough of the lower forming body.

While specific reference has been made herein to use of a muffle assembly having cooling tubes in a fusion forming apparatus, specifically a fusion lamination apparatus, it should be understood that similar muffle assemblies may be used in conjunction with fusion forming apparatuses which utilize only a single forming body, such as fusion forming apparatuses which are used to produce non-laminated glass articles. Such fusion forming apparatuses can be configured, for example, as shown in FIGS. 3-4, but with upper forming body 210 omitted therefrom. In these embodiments, the muffle assembly with the cooling tubes may be positioned around the single forming body and used to regulate the temperature of the glass within the trough of the forming body to, for example, regulate the flow rate of glass through the system and/or control the temperature of the glass flowing over the forming body between the trough and the root of the forming body.

Further, while specific examples of muffle assemblies with cooling tubes have been described herein, it should be understood that other techniques for establishing and/or maintaining a temperature gradient between the troughs of the forming bodies are contemplated and possible. Referring specifically to FIG. 4 by way of example, in an alternative embodiment, one or more heating elements of the first plurality of heating elements 300, 302, 304 and/or the second plurality of heating elements 306, 308, 310 may be removably positioned within the muffle assembly 250. These heating elements may be removed during operation of the fusion forming apparatus 200 and replaced with, for example, a cooling tube through which a cooling fluid is circulated in order to achieve the desired temperature gradient. This embodiment may be used in conjunction with the cooling provided with the at least one first cooling tube 260 and the at least one second cooling tube 265 or, alternatively, as a substitute for the cooling provided with the at least one first cooling tube 260 and the at least one second cooling tube 265.

Examples

The embodiments described herein will be further clarified by the following example.

A fusion forming apparatus with a muffle assembly having cooling tubes as depicted in FIG. 4 was mathematically modeled to determine the temperature gradient which could be achieved between the trough of the upper forming body and the trough of the lower forming body by cooling the trough of the lower forming body with cooling tubes. The fusion forming apparatus was modeled with a flow of molten cladding glass delivered to the trough of the upper forming body at a rate of 96.5 lb/hr and a flow of molten core glass delivered to the trough of the lower forming body at a rate of 150 lb/hr. The temperature of the glass in the trough of the upper forming body was modeled at 1159° C. and the temperature of the glass in the trough of the lower forming body was modeled at 1040° C. The modeled results were based on water flowing through the cooling tubes (3 cooling tubes, oriented in parallel on either side of the forming body as depicted in FIG. 4) at an initial temperature of 35° C. and a flow rate of 4 gallons/min. The heating elements closest to the trough of the lower forming body were modeled in an "on" state with approximately 1.8 kW of power delivered to the heating elements. A thermal plot of the modeled results is graphically depicted in FIG. 7.

Referring to FIG. 7, the fusion forming apparatus modeled under the conditions described above resulted in a temperature gradient of 119° C. between the trough of the upper forming body and the trough of the lower forming body. That is, the molten core glass composition in the trough of the lower forming body was cooler than the molten cladding glass composition in the trough of the upper forming body by 119° C. This data indicates that the muffle assembly with cooling tubes is effective for establishing a large temperature gradient between the troughs of the upper and lower forming bodies. This data also indicates that a large temperature gradient between the troughs of the upper and lower forming bodies may be established without switching off the power to the heating elements which, in turn, allows for improved control of the temperature and viscosity of the molten glass by using the heating elements in conjunction with the cooling tubes.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming a laminated glass ribbon, the method comprising:
   directing streams of a molten core glass composition over a first outer forming surface and a second outer forming surface of a lower forming body such that the streams of the molten core glass composition converge and fuse at a root of the lower forming body thereby forming a core layer of the laminated glass ribbon;
   directing streams of a molten cladding glass composition over a first outer forming surface and a second outer forming surface of an upper forming body positioned over the lower forming body such that the streams of the molten cladding glass composition contact the streams of the molten core glass composition thereby forming a first glass cladding layer and a second glass cladding layer of the laminated glass ribbon; and
   extracting heat from the molten core glass composition flowing over the first outer forming surface and the second outer forming surface of the lower forming body with at least one first cooling tube extending substantially parallel to the first outer forming surface of the lower forming body and at least one second cooling tube extending substantially parallel to the second outer forming surface of the lower forming body, the lower forming body being disposed between the at least one first cooling tube and the at least one second cooling tube, wherein:
   a first refractory material is disposed between the at least one first cooling tube and the first outer forming surface of the lower forming body and in direct contact with the at least one first cooling tube thereby forming a first continuous heat conduction pathway extending away from the first outer forming surface of the lower forming body in a substantially horizontal direction; and
   a second refractory material is disposed between the at least one second cooling tube and the second outer forming surface and in direct contact with the at least one second cooling tube thereby forming a second continuous heat conduction pathway extending away from the second outer forming surface of the lower forming body in the substantially horizontal direction, the first continuous heat conduction pathway and the second continuous heat conduction pathway forming a vertical temperature gradient between the upper forming body and the lower forming body.

2. The method of claim 1, wherein the vertical temperature gradient between the upper forming body and the lower forming body is greater than or equal to 100° C.

3. The method of claim 1, wherein the vertical temperature gradient between the upper forming body and the lower forming body is greater than or equal to 120° C. and less than or equal to 140° C.

4. The method of claim 1, wherein the at least one first cooling tube and the at least one second cooling tube extend through a muffle frame positioned around the lower forming body.

5. The method of claim 1, wherein the extracting heat from the molten core glass composition comprises flowing a cooling fluid through the at least one first cooling tube and the at least one second cooling tube.

6. The method of claim 5, wherein:
   the at least one first cooling tube comprises a first plurality of cooling tubes arranged in parallel with one another; and
   cooling fluid flowing through adjacent cooling tubes of the first plurality of cooling tubes flows in opposite directions.

7. The method of claim 5, wherein the extracting heat from the molten core glass composition further comprises at least one of regulating a volume of the cooling fluid flowing through the at least one first cooling tube and the at least one second cooling tube or regulating a temperature of the cooling fluid flowing through the at least one first cooling tube and the at least one second cooling tube.

8. The method of claim 1, wherein the at least one first cooling tube and the at least one second cooling tube are removably positioned in the muffle assembly.

9. The method of claim 1, wherein the at least one first cooling tube and the at least one second cooling tube are formed from stainless steel and coated with a coating having an emissivity greater than or equal to 0.95.

* * * * *

UNITED STATES PATENT AND TRADEMARK OFFICE
CERTIFICATE OF CORRECTION

PATENT NO. : 10,889,520 B2
APPLICATION NO. : 16/094131
DATED : January 12, 2021
INVENTOR(S) : John Michael Feenaughty et al.

It is certified that error appears in the above-identified patent and that said Letters Patent is hereby corrected as shown below:

On the Title Page

In Column 2, item (57), Abstract, Line 11, delete "closed loop" and insert -- closed-loop --, therefor.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*